(12) United States Patent
Maier

(10) Patent No.: US 7,404,715 B2
(45) Date of Patent: Jul. 29, 2008

(54) DEVICE FOR SIMULATING A ROD-SHAPED SURGICAL INSTRUMENT FOR GENERATING A FEEDBACK SIGNAL

(75) Inventor: Michael Maier, Versoix (CH)

(73) Assignee: Xitact S.A., Morges (CH)

( * ) Notice: Subject to any disclaimer, the term of this patent is extended or adjusted under 35 U.S.C. 154(b) by 765 days.

(21) Appl. No.: 10/488,369

(22) PCT Filed: Sep. 3, 2002

(86) PCT No.: PCT/CH02/00485

§ 371 (c)(1),
(2), (4) Date: Mar. 2, 2004

(87) PCT Pub. No.: WO03/021553

PCT Pub. Date: Mar. 13, 2003

(65) Prior Publication Data

US 2005/0069854 A1    Mar. 31, 2005

(30) Foreign Application Priority Data

Sep. 3, 2001 (CH) .................................... 1635/01
Apr. 4, 2002 (CH) .................................... 0573/02

(51) Int. Cl.
*G09B 23/28* (2006.01)
(52) U.S. Cl. .................................... 434/262
(58) Field of Classification Search ................. 434/262, 434/267, 270, 272, 273, 274, 275
See application file for complete search history.

(56) References Cited

U.S. PATENT DOCUMENTS

| | | | | |
|---|---|---|---|---|
| 5,882,206 A * | 3/1999 | Gillio | ........................ | 434/262 |
| 6,088,020 A * | 7/2000 | Mor | ........................ | 345/156 |
| 6,106,301 A * | 8/2000 | Merril | ........................ | 434/262 |
| 6,267,599 B1 * | 7/2001 | Bailey | ........................ | 434/262 |
| 6,470,302 B1 * | 10/2002 | Cunningham et al. | ........ | 703/7 |
| 6,929,481 B1 * | 8/2005 | Alexander et al. | ........ | 434/262 |
| 7,056,123 B2 * | 6/2006 | Gregorio et al. | ........ | 434/272 |
| 7,156,664 B2 * | 1/2007 | Wallaker | ........ | 434/262 |
| 7,236,618 B1 * | 6/2007 | Chui et al. | ........ | 382/128 |
| 7,249,951 B2 * | 7/2007 | Bevirt et al. | ........ | 434/262 |
| 7,249,952 B2 * | 7/2007 | Ranta et al. | ........ | 434/263 |

\* cited by examiner

*Primary Examiner*—Kurt Fernstrom
(74) *Attorney, Agent, or Firm*—The Webb Law Firm

(57) ABSTRACT

The invention relates to a device for simulating a rod-shaped virtual surgical instrument, in particular for simulating an endoscopic instrument comprising a handle. Said device is provided with a virtual trocar and is equipped with force feedback apparatus. The force feedback apparatus has two connecting pieces, one connecting piece being connected to one half of the handle and the other connecting piece being connected to the other half of the handle. The two connecting pieces are interconnected in a detachable engagement in such a way, that said two connecting pieces can be displaced freely in relation to one another in a first control position and in a second control position and can only be displaced in relation to one another by means of the spring by applying a force to the handle.

19 Claims, 4 Drawing Sheets

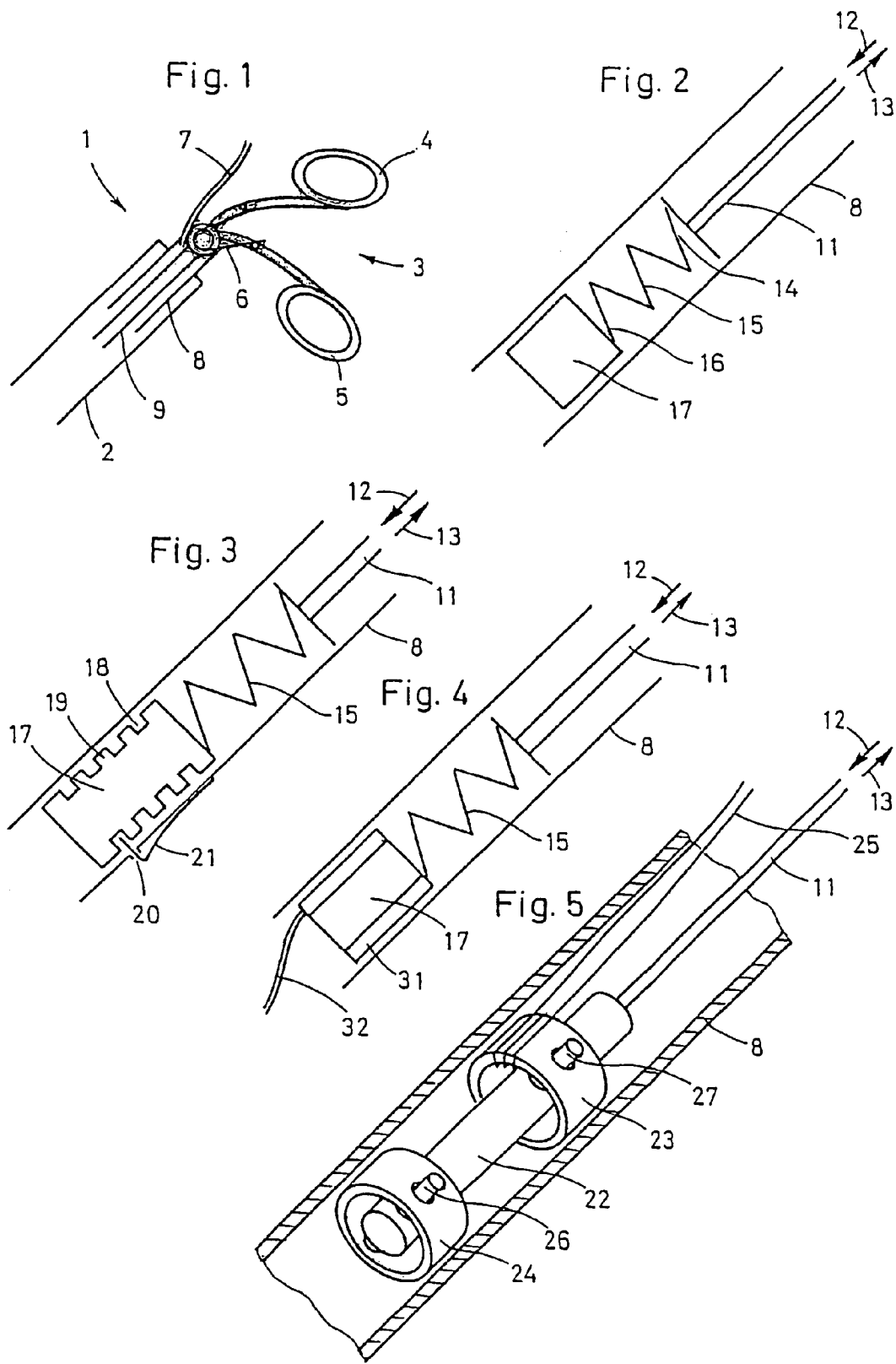

DEVICE FOR SIMULATING A ROD-SHAPED SURGICAL INSTRUMENT FOR GENERATING A FEEDBACK SIGNAL

BACKGROUND OF THE INVENTION

1) Field of the Invention

This invention relates to a device for the simulation of a rod-shaped virtual surgical instrument, in particular for the simulation of an endoscopic instrument, for the generation of a feedback signal, with a sleeve in which a push rod is located.

2) Description of the Related Art

A force feedback is almost always used in a device for use in the simulation of surgical procedures, in particular endoscopic surgeries, to provide a simulation for the operator of the resistance encountered by the instrument as it penetrates tissue or comes into contact with internal organs and other elements. When clamps or scissors are to be used, the operator thereby uses a corresponding scissors-shaped handle of a simulated instrument which simulates the actual handle. Generally, a spring is then located between the handle parts of the pair of scissors, as on the actual instrument, against the resistance of which the handles of the scissors can be compressed.

This device of the prior art has the disadvantage that when the surgeon is cutting through tissue, after the cut, it should be possible to close these scissors without encountering any significant additional resistance, which cannot be realized with the spring that is used in the devices of the prior art. Furthermore, when a virtual clamp of the type described in the prior art is used, during the actuation of the handle a resistance can be felt directly that does not increase as the simulated clamping action begins to increase, and in particular does not vary as a function of the tissue on the basis of the elasticity of the tissue to which the force is being applied. The prior art also discloses a variety of additional simulated surgical instruments that are used in endoscopic procedures. Most of these instruments have a handle in the form of a scissors-type handle, by means of which the user performing the simulation can clamp, grip or cut something. In these devices of the prior art, one half of the scissors can be moved against a spring tension, so that an increasing pressure is transmitted to the user as the halves of the scissors close.

The devices of the prior art have a number of disadvantages, in particular the fact that unrestricted movement is not suddenly restored when the scissors have cut all the way through a simulated object. Furthermore, there is no ability to simulate the impact of the simulated element against an inflexible or inelastic resistance.

SUMMARY OF THE INVENTION

On the basis of the devices of the prior art described above, the object of the invention is a device of the type described above which offers improved feedback sensitivity for the user, i.e. in particular a device in which the surgeon feels a lessening of the resistance when the cut has been made all the way through the tissue, just as occurs when the surgeon is using endoscopic scissors to perform a real cutting action, and when using a virtual clamp experiences an increase in the resistance when the instrument comes into contact with the surface of the object to be clamped.

By providing a push rod brake with an electrically operated spring collet chuck, it becomes possible on one hand to simulate an increasing feedback force, and on the other hand to fix the push rod in position at any time, so that it can subsequently be fully released and thus be restored to its former unrestricted mobility.

In an additional configuration of the invention, the passive feedback element is located inside the shaft, which means that this feedback element can be very compact. As a result of its small size, this device is also very lightweight, which means that the mass of the virtual instrument that must be moved by the external force feedback remains small.

Additional advantageous characteristics of the invention are disclosed herein.

BRIEF DESCRIPTION OF THE DRAWINGS

FIG. 1 is a schematic view of a handle of a virtual endoscopic instrument according to the present invention, FIG. 2 is a schematic view of a first exemplary embodiment of a shaft area of the instrument illustrated in FIG. 1 in an "unrestricted mobility" condition, FIG. 3 is a schematic view of the first exemplary embodiment of the shaft area of the instrument illustrated in FIG. 1 in a "locked" status, FIG. 4 is a schematic view of a second exemplary embodiment of a shaft area of the instrument in the "locked" status according to the present invention, FIG. 5 is a schematic view of a third exemplary embodiment of a shaft area of the instrument in a "freely mobile" status according to the present invention.

DESCRIPTION OF THE PREFERRED EMBODIMENTS

Figure 6:
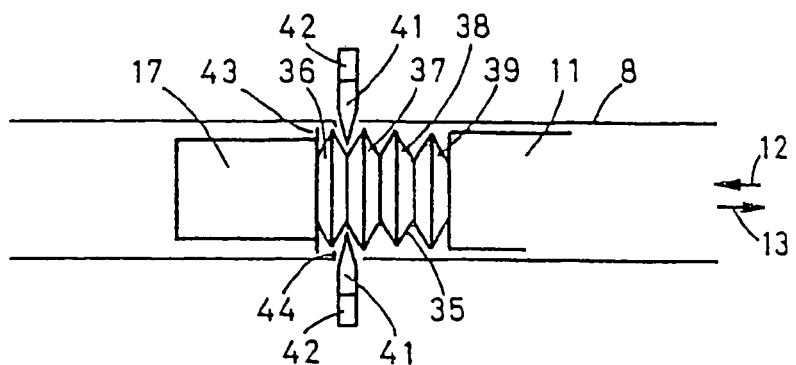
FIG. 6 is a schematic view of a fourth exemplary embodiment of a shaft area of the instrument in the "locked" status according to the present invention.

FIG. 1 is a schematic illustration of the upper portion of a virtual endoscopic instrument 1. This instrument 1 has a virtual trocar 2 which in this case is realized in the form of a hollow tube. Inside the tube 2 there is an outer tube 8 with an inner tube 9 that is guided inside the outer tube 8, and both tubes are connected with the scissors handle 3. The scissors handle 3 has two handle halves 4 and 5, each of which is connected with the outer tube 8 and the inner tube 9. In the illustrated embodiment, the scissors half 4 is connected in a fixed manner with the outer tube 8 and the scissors half 5 can move in relation to the scissors half 4, and is connected with the inner tube 9. Between the two scissors halves 4 and 5 there is a leaf spring element 6 that has a spreading action and returns the scissors halves 4 and 5 to their starting position when no pressure is being exerted. This spring can also be omitted, and in addition to the spring or in place of the spring, interlocking elements and ratchets or other elements known from current surgical technology can be provided.

Additionally, electrical and other feed cables 7 can also be routed through the hollow tube 2 and/or in the outer tube 8 and/or the inner tube 9.

FIG. 2 is a schematic illustration of one exemplary embodiment of the device claimed by the invention. In all the exemplary embodiments, the same features are identified by the same reference numbers. A hollow tube, which contains the device, among other things, is once again identified by the reference number 8. However, this hollow tube can be different from the tube that is guided in the virtual trocar tube 2 that is illustrated in FIG. 2. In particular, it can be thinner and need not run coaxially with the trocar 2 illustrated in FIG. 1.

An actuator rod 11 that is connected with the inner tube 9 is guided in the tube 8, and in the illustrated embodiment the actuator rod 11 is rigid and centrally guided. However, said actuator rod 11 can also have a different configuration, as long as it can transmit forces in both directions in the direction of its longitudinal axis, i.e. a forward thrust as indicated by the arrow 12 when the handle halves 4 and 5 are closed, and a retraction force when the handle halves 4 and 5 are opened, as indicated by the arrow 13.

One end 14 of a spring element 15 is fastened to the rod 11. The spring element in question can be a coil compression spring. A locking block 17 is provided on the end of the spring 15 opposite the end 14, i.e. on the end 16. In this case, the locking block 17 is illustrated schematically and non-specifically. Two possible exemplary embodiments of the locking block 17 are illustrated in FIGS. 3 and 4. During the unrestricted movement of the handle halves 4 and 5, or optionally their movement against a small spring force 6, the rod 11 is moved, and when the spring 15 does not begin to oscillate, the locking block 17 also moves freely in the tube 8.

FIGS. 3 and 4, which are schematic illustrations of two exemplary embodiments, show how the unrestricted movement described with reference to FIG. 2 can be stopped, to generate a passive force feedback. FIG. 3 shows the locked position of a virtual instrument of the type illustrated in FIG. 1 on the basis of a first exemplary embodiment. The locking block 17 is longer than it is wide, cylindrical and has annular grooves 18, only four of which are illustrated in the figure. In fact, there can be a very large number of grooves 18, which can be located at small intervals of 1 millimeter each, for example. The rings 19 that are left between the grooves 18 can be on the same order of magnitude of 1 millimeter in the longitudinal direction. At one point on the cylindrical external surface 8 of the tube there is an opening 20 in which an L-shaped hook 21, which is illustrated only schematically, can be engaged. The hook 21 is directly or indirectly connected on one end with the tube 8.

The operation of the device claimed by the invention is described below. It is assumed that the rod 11 is advanced in the direction indicated by the arrow 12 as a consequence of the closing movement of the scissors halves 4 and 5 by the surgeon, to close the virtual cutting element or the virtual clamp, for example. As illustrated in FIG. 2, the locking block is thereby also displaced in the direction indicated by the arrow 12. At the instant when the virtual clamp touches the virtual tissue, or when the scissors begin to actually cut the tissue, the L-shaped hook or mandrel 21 is pushed essentially radially through the opening 20 and catches in the groove 18 which is just in front of it. The control device provided for this purpose is not illustrated in the drawings. For example, the control device can actuate an electromagnet which pushes the mandrel 21 through the opening against the resistance of the leaf spring that is created by its L-shape and fastening. Another type of actuation using piezoelectric elements is described with reference to FIG. 6.

The locking block is thereby completely immobilized and the rod 11 can be advanced further only by compression of the spring 15. To that extent, as the scissors halves are compressed further, the pressure increases with a linear characteristic and gives the surgeon the feeling of force feedback. When the virtual clamp is released, it may happen that the object adheres to the virtual clamp after the clamped object has been restored to its original shape, which leads to a condition where if the scissors halves 4 and 5 must be opened further, they must be opened against the pressure generated by this adherence. This situation can be simulated by keeping the mandrel 21 engaged in the groove 18, because then the spring 15 is stretched beyond its normal position and thus once again provides a force feedback for the surgeon.

In the general case, for example when a cut has been made all the way through a tissue object or when a clamp is released, the surgeon does not sense any further pressure, which is achieved in the exemplary embodiment illustrated in FIG. 3 by the restoration of the unrestricted movement of the locking block 17 illustrated in FIG. 2, which is achieved in a simple manner by removing the mandrel 21 from the groove 18, so that the locking block 17 once again becomes freely mobile.

FIG. 4, which is similar to FIG. 3, shows another form of immobilizing the locking block 17 in the tube 8. In this case, the locking block 17 is immobilized by an electromagnet 31 which, when activated, attracts the at least partly magnetic tube 8 or a corresponding outer jacket around the tube 8 or the trocar 2 and is thereby fixed in position in the tube 8 in the current position along the longitudinal axis. The reference number 32 identifies an electrical cable, by means of which the electromagnet 31 is actuated. In the exemplary embodiment illustrated in FIG. 4, a continuous clamping is possible, although on the other hand the use of a locking block 17 as illustrated in FIG. 2 or 3 makes possible a digital clamping, i.e. in one of a predetermined number of positions.

FIG. 5 shows an additional exemplary embodiment, in which the restraining force is exerted from the tube 8 itself. In this case, there are two brake rings 23 and 24 on a control end 22 of the shaft 11. These brake rings are actuated by means of a feeder line 25 inside the shaft 2. By applying a corresponding electrical control signal to the brake rings by means of the control device, the brake rings are pressed against the inside wall of the tube 2, whereby the control specifies the application pressure and thus the force feedback by means of the corresponding signal strength. In particular, the rods 26 and 27 can be backed with magnetostrictive material, so that by a corresponding actuation of this material the rods 26 and 27 are pushed outward in the radial direction, and the apparent diameter of the brake rings 23 and 24 represented by the rods 26, 27 increases and thus a force feedback is achieved by the introduction of a friction force. In other words, by increasing the overall diameter of the rods 26, 27, they can be made to exert an increasing braking force on the movement of the handle 3 and/or can represent an incompressible resistance. When the engagement is released (=reduction of the diameter of the rods 26 and 27), the handle becomes freely mobile and can in particular be retracted into the starting position by the spring 6 in the handle. This friction force can in particular be a continuously variable force. In one control position, the rod 11 is thereby freely mobile, while the second control position is defined so that it includes a plurality of continuously variable control positions, which are each defined instantaneously by the prevailing frictional engagement.

FIG. 6 is a schematic illustration of a composite spring 35, which in this case is realized in the form of the combination of four disk spring washers 36, 37, 38 and 39. In this case, there are two wedge-shaped bolts 41, each of which is inserted by a piezoelectric crystal 42 that can be actuated by the above mentioned control device into the area between two disk spring washers, in this case 36 and 37, to lock the locking block 17 in position. Theoretically, it is not necessary to provide a locking block 17. Advantageously, behind the last disk spring washer 36 there is a flange 43, which interacts with a corresponding projection 44 to guarantee that a force feedback is applied, at least beginning in one extreme position.

The particular advantage of this arrangement is that optionally, different disk spring washers 36 to 39 can be provided, each of which, depending on their engagement, achieves a different linearity of the force feedback.

Figure 7:
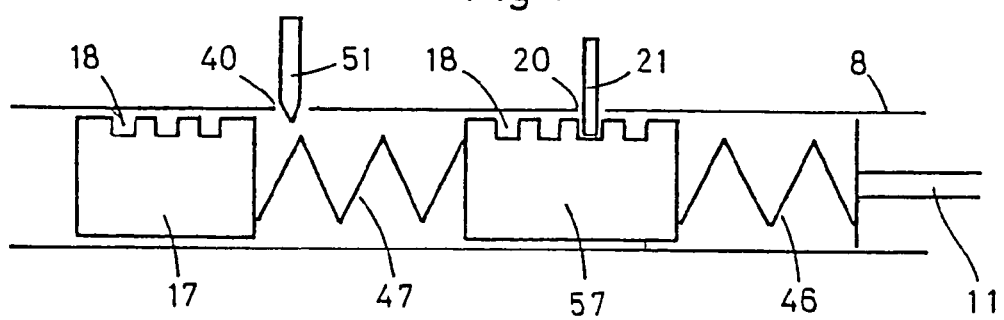
FIG. 7 is a schematic view of a fifth exemplary embodiment of a shaft area of the instrument in the "freely mobile" status according to the present invention.

FIG. 7 shows one passive feedback configuration with a pair 45 of springs consisting of springs 46 and 47, whereby an additional locking block element 57 is located between the two springs 46 and 47. With one or two bolts 21 and 51, as appropriate, which can project through the openings 20 and 40 respectively, the locking blocks 17 and 57 can be fixed in position individually, so that two different force-displacement curves can be realized.

Instead of the cylindrical tube 8 described above, any other type of simulation device can also be used in which the actuation of the handle of a virtual instrument is to be simulated with a force feedback.

Figure 8:
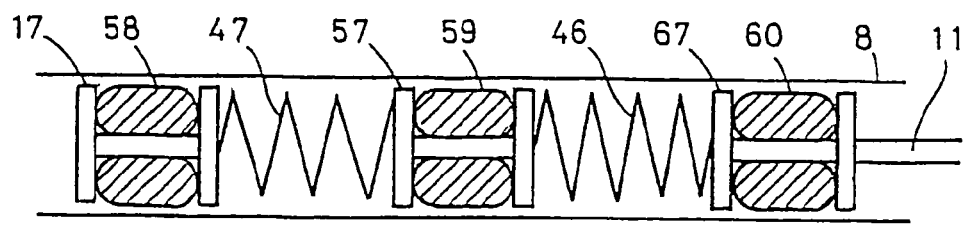
FIG. 8 is a schematic view of a modified fifth exemplary embodiment of a shaft area of the instrument in the "freely mobile" status according to the present invention.

FIG. 8 is a schematic illustration of the unrestricted mobility of a modified fifth exemplary embodiment of the invention which has three spring elements. In this case, two springs 46 and 47 are inserted in an outer tube 8. The spring 46 and the overall system consisting of the springs 46 and 47 will advantageously have different spring constants. Behind and between the springs 46 and 47 there are three locking block elements 17, 57 and 67. The locking block elements 17, 57 and 67 each comprise electromagnets 58, 59 and 60, which are connected with the control device by means of feeder lines not shown in FIG. 8. By means of control signals that are directed to one of the electromagnets 58, 59 or 60, the corresponding locking block elements 15, 57 or 67 respectively are fixed in position inside the metal tube 8, resulting in three control positions, whereby on one hand the spring system consisting of springs 46 and 47 determines the spring constant, and on the other hand the spring constant is determined by the spring 46 alone and a control position locks the rod 11 very simply and corresponds to the incompressibility of the object which, for example, is being gripped by the forceps.

Figure 9:
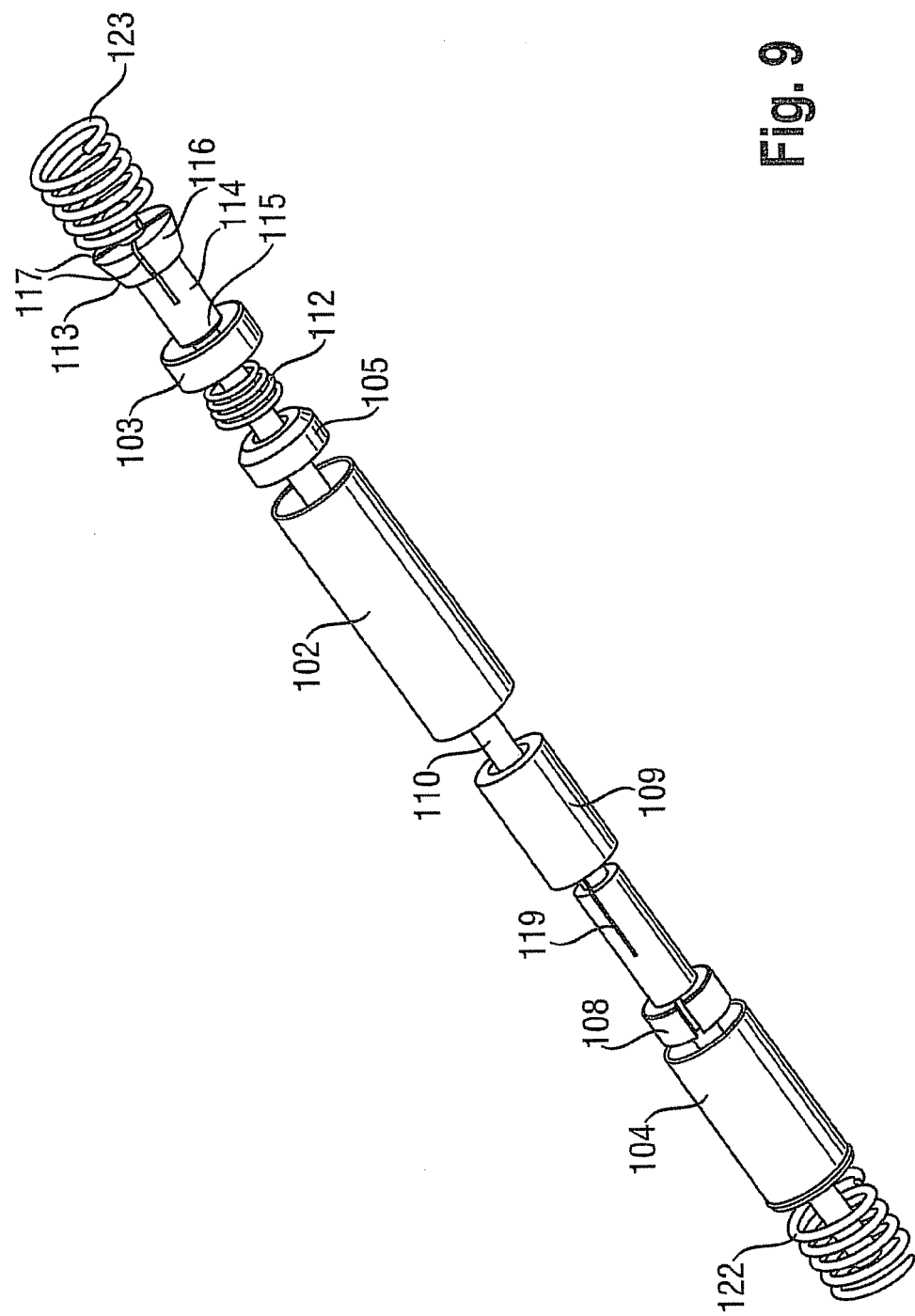
FIG. 9 is an exploded perspective view of a virtual endoscopic instrument according to the present invention.
Figure 10:
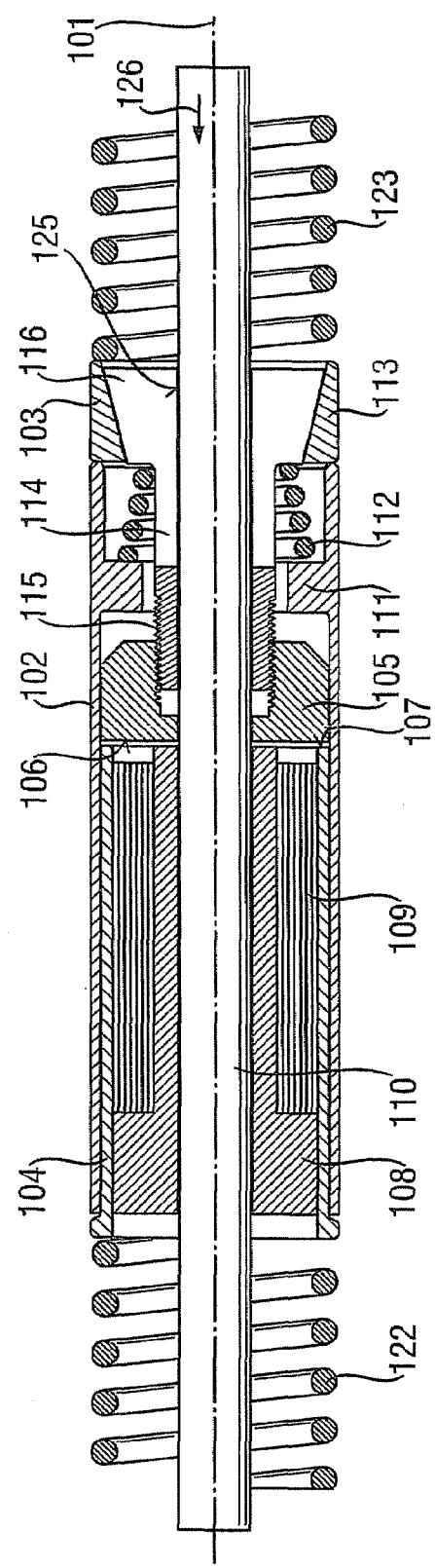
FIG. 10 is a cross-sectional view of the virtual endoscopic instrument of FIG. 9.

FIG. 9 is a view in perspective of the device in an additional exemplary embodiment of the invention in a view in which the individual elements are arranged along the longitudinal axis 100 of the device in an exploded view. FIG. 10 is a cross-sectional view of a virtual endoscopic instrument according to the present invention. The cross section is taken alone the longitudinal axis 100 of the device. The simulation of surgical elements that are longer than they are wide is frequently geared toward their applications in endoscopy of treatments that are administered through bodily orifices. These elements then have a tubular outer body in which the device is guided. The sleeve 102 of the device is fastened to this tubular outer body. The sleeve 102 or also the reinforcing tube is bounded on its one end by a male taper 103 which comes into contact against the cylindrical surface of the sleeve 102. On the opposite end of the sleeve 102 there is a cylindrical circular magnet that is inserted into the sleeve 102. There can thereby be a threaded connection between the sleeve 102 and the circular magnet 104 or the elements can be connected to each other by means of an interference fit.

In the interior of the tube 102, the far end 107 of the circular magnet 104 presses against the plunger 105. The ring-shaped surface 106 of the plunger 105 is very smooth and is located at a very short distance of a few tenths of a millimeter from the above-mentioned end 107 of the circular magnet 104. Inside the circular magnet 104 there is an armature 108 which is inserted in a defined position. The armature 108 is a hollow cylinder and is located around a central push rod 110. The circular magnet 104 and the armature 108 are located flush with the surface 106 of the plunger 105. The armature 108 has, on its periphery, a recess in which a coil 109 is located. In the illustrated exemplary embodiment, the coil 109 has 970 windings. The number of windings is cited by way of example and is selected as a function of other variables that define the electromagnet, such as the configuration of the armature 108, the electrical circuitry of the magnet etc.

Inside the tube there is a shoulder 111 which is connected in one piece with said tube 102, whereby the shoulder forms a stop for a restoring spring 112 which is located on the facing side of the circular magnet 104 with the armature 108 and plunger 105. Naturally, the tube 102 can also be designed so that it consists of a plurality of pieces or the tube 102 can be realized by extensions that extend through the tube 102. The spring 112 is supported on the side opposite the stop 111 on the forceps element 113. The forceps element 113 has a cylindrical segment 114 on which a thread 115 is provided in its terminal portion. The male thread 115 is engaged in a corresponding female thread on the plunger 105. On the side of the forceps element 113 opposite the male thread 115 there is a widening tapered area 116 which is realized complementary to the taper of 103. FIG. 9 shows clearly that the tapered area 116 has four identical longitudinal slots 117 that are at identical intervals from one another. Instead of four slots 117, there can also be two, three or more slots.

On the free end of the tube 102 and the conical section 103 there are two springs 122 and 123, between which this assembly is suspended. The springs 122 and 123 are provided to absorb the forces that are generated by the device for the generation of a feedback signal (brake component), and when the brake is locked, to exert an elastic action on the handle. In the device illustrated in the exemplary embodiment, the travel that is thereby possible in the push rod is approximately 2.5 millimeters. This travel can be set to any desired value by means of the spring constant.

The operation of the device is described in greater detail below. When the movement of the handle of the simulated instrument is unrestricted, for example, the push rod 110 can move freely inside the tube 102. If the simulated instrument then encounters a resistance, e.g. a simulated organ or another simulated object such as a surgical instrument, the push rod 110 can then no longer move entirely freely in the tube 102. The restriction is simulated by conducting an electrical current via the feeder lines into the coil 109 so that a magnetic field is generated in the tube 102, whereby with the action of the electromagnet formed by the coil 109 and the armature 108, together with the circular magnet 104, the plunger 105 is attracted toward the elements 104 and 108. Because the plunger 105 is connected with the tapered portion 113 by means of the thread 115, the tapered portion 116 is also pulled toward the circular magnet and thus into the tube 102. Because the tapered portion 116 faces the complementary cone 103, both of which are made of incompressible material, but the cone 116 has the above mentioned slots 117, the inner cylindrical portion 125 of the element 113 is pressed against the surface of the push rod 110 as the element 113 moves in the direction indicated by the arrow 126. As the current that flows into the coil 109 increases, the attraction force on the plunger 105 increases, and thus the tapered portion 116 of the element 113 is pulled farther into the complementary tapered portion 103, whereby the pressure of the surface 125 on the push rod 110 increases steadily until at a maximum current, the relative movement of the push rod ends and it no longer moves relative to the tube 102. When the handle is released, the current flowing into the coil 109 is shut off and thus the attraction force exerted by the electromagnet on the plunger 105 is terminated. The spring 112 thereby guarantees that the tapered portion 113 is released from its engagement with the facing tapered portion 103 and thus the force acting on the surface 125 is also terminated.

The tapered portions 113 and 116 are inclined at exactly the same angle. This angle can be between a few degrees and a maximum of 45 degrees, for example. When the device is being assembled, care must be taken that the distance between the circular magnet 104 and the plunger 105 is set correctly, on one hand to achieve an immediate adherence of the plunger 105 to the circular magnet 104, and on the other hand to avoid a weak magnetic coupling with an excessive distance between the circular magnet 104 and the plunger 105. In the idle position, the surface 125 may only be in contact with the push rod 110 and there may be a pressing action only when there is a longitudinal movement of the tapered portion 113 in the tapered portion 103 in the direction indicated by the arrow 126.

It is essential that, depending on the current introduced into the electromagnets 104, 108, 109, the feedback signal can be more or less intense, and in the extreme case can even be applied directly between the close coupling of push rod 110 and the sleeve 102, and reverses the unrestricted movement of the push rod 110 in the sleeve 102.

Naturally, variations and modifications can be made in the form of additional exemplary embodiments that are not illustrated in the figures, provided that such variations and modifications do not go beyond the scope of the invention. The essential feature is the clamping of the push rod 110 by two complementary tapered portions 116 and 103 by the electromagnetic action of a plunger 105 of an electromagnet which is effectively connected with a tapered portion 116 or 103.

The invention claimed is:

1. A device for the simulation of a rod-shaped virtual surgical instrument for the generation of a feedback signal, having a sleeve, wherein the sleeve has a push rod located symmetrically around the longitudinal axis of the sleeve, wherein a control device is provided, with which the sleeve and the push rod is brought into a detachable engagement with each other, so that in a first control position the sleeve and the push rod are freely mobile with respect to each other and in a second control position the sleeve and the push rod is moveable only by the application of a force to the device or not moveable, wherein the sleeve includes an electromagnet connected thereto and a metal plunger therein configured to move with respect to the electromagnet in the direction of the longitudinal axis, wherein the plunger is attractable by the action of the electromagnet, wherein the side of the sleeve facing the electromagnet has a first tapered portion that tapers toward the inside of the sleeve, wherein the plunger is effectively connected with a second tapered portion that is complementary to the first tapered portion, whereby the surface of the second tapered portion facing the push rod is frictionally fitted against the push rod.

2. The device as claimed in claim 1, wherein the second tapered portion has at least two longitudinal slots.

3. The device as claimed in claim 1, wherein the sleeve includes a shoulder that projects into the sleeve interior, wherein the shoulder acts as a stop for a restoring spring, whereby the second tapered portion acts as a facing stop.

4. The device as claimed in claim 3, wherein the second tapered section includes a hollow cylindrical segment located around the push rod, wherein on the end of the hollow cylindrical segment spaced from the second tapered portion a thread is provided, wherein the thread is engaged with a complementary thread of the plunger.

5. The device as claimed in claim 1, wherein the electromagnet includes a circular magnet, an internal armature, and a coil, located between the circular magnet and the armature, whereby radial surfaces of the circular magnet, the internal armature, and the coil are located opposite the plunger and are flush with each other, whereby the facing surface of the plunger is oriented radially and parallel to the radial surfaces of the electromagnets.

6. The device as claimed in claim 1, wherein a first spring and a second spring are located on opposite sides of the sleeve, whereby the device is moveable flexibly when it is fastened to the push rod.

7. The device as claimed in claim 1, wherein the virtual surgical instrument includes a handle having a first half and a second half, a virtual trocar, and a force feedback device, whereby the force feedback device includes the sleeve connected to the first handle half and the push rod, wherein the push rod is connected with the second handle half, whereby in the second control position the sleeve and the push rod is only moveable in relation to one another by one of (i) the application of force on the first and second handle halves; and (ii) not moveable.

8. The device as claimed in claim 7, wherein the force feedback device includes a locking element, a spring element and engagement elements, wherein the spring element is permanently connected with the push rod and the locking element, and wherein the engagement elements via a control device, can fix the locking element in position with respect to the sleeve.

9. The device as claimed in claim 8, wherein the engagement elements are at least one mandrel engaged in one of the locking element and the spring.

10. The device as claimed in claim 9, wherein the sleeve is a hollow tube in which at least one opening is provided, through which at least one mandrel is radially insertable.

11. The device as claimed in claim 9, wherein the spring includes a plurality of disk spring washers.

12. The device as claimed in claim 9, further comprising at least one of a piezoelectric crystal and electromagnet energized by the control device for moving at least one mandrel.

13. The device as claimed in claim 9, wherein the locking element has at least one radial groove, wherein the at least one mandrel is insertable.

14. The device as claimed in claim 8, wherein the engagement elements includes an electromagnet actuatable by the control device, and means for fixing the locking element in position with respect to the sleeve.

15. The device as claimed in claim 8, wherein elements for introducing a frictional force between a detachable engagement of the sleeve and the push rod elements are provided.

16. The device as claimed in claim 7, wherein the second control position contains a plurality of continuously variable control positions.

17. The device as claimed in claim 7, wherein at least one of the sleeve and the push rod which are positively or non-positively connected with each other provide the detachable engagement.

18. The device as claimed in claim 10, further comprising at least one of a piezoelectric crystal and an electromagnet energized by the control device for moving at least one mandrel.

19. The device as claimed in claim 11, further comprising at least one of a piezoelectric crystal and an electromagnet energized by the control device for moving at least one mandrel.

* * * * *